(12) United States Patent
Kadakia (10) Patent No.: US 7,617,415 B1
(45) Date of Patent: Nov. 10, 2009

(54) CODE COVERAGE QUALITY ESTIMATOR

(75) Inventor: Nirave D. Kadakia, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 389 days.

(21) Appl. No.: 11/461,391

(22) Filed: Jul. 31, 2006

(51) Int. Cl.
*G06F 11/00* (2006.01)
(52) U.S. Cl. .......................... 714/26; 714/38; 717/124; 717/126
(58) Field of Classification Search ................... 714/26, 714/38; 717/124, 126
See application file for complete search history.

(56) References Cited

U.S. PATENT DOCUMENTS

| | | | | |
|---|---|---|---|---|
| 4,853,851 | A * | 8/1989 | Horsch ......................... | 714/38 |
| 6,088,690 | A * | 7/2000 | Gounares et al. .............. | 706/13 |
| 6,959,431 | B1 * | 10/2005 | Shiels et al. ................. | 717/124 |
| 6,978,401 | B2 * | 12/2005 | Avvari et al. .................. | 714/38 |

OTHER PUBLICATIONS

Anderson et al. "Assessing Neural Networks as Guides for Testing Activities." Proc. of METRICS 1996. copyright 1996.*
Lasse Koskela,, "Introduction to Code Coverage", JavaRanch Journal, Jan. 2004, http://www.javaranch.com/newsletter/200401/IntroToCodeCoverage.html, pp. 1-14.

* cited by examiner

*Primary Examiner*—Robert Beausoliel
*Assistant Examiner*—Philip Guyton
(74) *Attorney, Agent, or Firm*—Martine Penilla & Gencarella, LLP (57) ABSTRACT

A method for estimating a quality of code coverage of a test is described. The method includes training a neural network, using the neural network to generate a risk factor for each code element, and determining a coverage quality based on risk factors of executed code elements and risk factors of unexecuted code elements. The neural network is trained by inputting suggestive data as input and error severity data as output. Suggestive data may be data that correlates to a likelihood that a code element contains an error, and the error severity data is an evaluation of a severity of any error that was present in the code element. A coverage quality can be determined based on the risk factors of the code elements tested during the test and the risk factors of the code elements not tested during the test.

16 Claims, 3 Drawing Sheets

CODE COVERAGE QUALITY ESTIMATOR

BACKGROUND

When testing computer programs, it is important to measure the thoroughness of the testing. Testing involves executing compiled computer code to ensure that no errors are generated and to ensure that the program produces the expected result or functionality. If an error is discovered, it may be corrected. However, fixing one error can create a new errors or uncover previously hidden errors. Therefore, each time the code is modified, it needs to be retested.

Code is commonly tested by executing the program and operating the computer program to exercise as much of the code as possible. Tools are available to assist in code testing by identifying what percentage of the code has been executed during the course of a test. Code can be instrumented by existing pre-compilers, or tested using interpreters or just-in-time compilers for monitoring the execution of the program in terms of the source code. For example, the compiled code may be modified by a pre-compiler or compiled with a compile option provided with the compiler that integrates source code coverage reporting functionality in the resulting compiled code. This information can then be used to identify the percentage of statements executed during the test, and perhaps target specific routines or procedures that require additional testing. The percentage of source code that is executed during a test is referred in the art as "code coverage."

Thus, code coverage analysis is a way to measure the thoroughness of a test by measuring the amount of code executed, either by statement, path, or condition, during a test. Code coverage by statement provides the percentage of statements that were executed. Code coverage by path provides a percentage of possible execution paths that were followed in the course of the test. Code coverage by condition provides a percentage of evaluation points, such as a true/false decision, that were executed. Other types of code coverage are known, such as basic block coverage and function coverage. A basic block is a code segment that is always executed together, i.e., it has no internal jumps or jump targets. A function is a subdivision of code that can be called from other locations in the program. Achieving 100% code coverage in any category can be very time consuming and inefficient.

Unfortunately, testing anything below 100% code coverage is very subjective. For instance, testing a certain percentage of code does not necessarily mean the right code is tested. For example, a fairly exhaustive test scenario may only test 20 percent of the code, yet an incomplete test scenario may actually cover 35% of the code. Code coverage analyses, especially among black box testers, is often looked down upon because of this limitation. The phrase "black box testing" refers to a testing methodology wherein varying inputs are presented to a computer program, and the resulting outputs are checked to ensure that they conform to the expected outputs, without regard to the internal workings of the program.

Because of the inadequacies of existing code coverage measurement methodologies as described above, a new mechanism is needed for estimating a quality of the code coverage in addition to, or instead of, a simple percentage value of code coverage.

SUMMARY

Broadly speaking, the present invention fills these needs by providing a code coverage quality estimator.

It should be appreciated that the present invention can be implemented in numerous ways, including as a process, an apparatus, a system, a device, or a method. Several inventive embodiments of the present invention are described below.

In one embodiment, a method for estimating a quality of code coverage of a test is provided. The method includes training a neural network and using the neural network to generate a risk factor for each code element. The neural network is trained by placing the neural network in a learning mode and inputting suggestive data as input and error severity data as output, the output being presented to the neural network when the neural network is in the learning mode. Suggestive data includes data that correlates to a likelihood that a code element contains a severe error. Error severity data is an evaluation of a severity of any error that was present in the code element. The risk factor is a value representing a likelihood and severity of an error in the code element. A coverage quality is determined based on the risk factors of the code elements executed during the test and the risk factors of the code elements not executed during the test.

In another embodiment, a machine readable medium for estimating a quality of code coverage of a test is provided. The machine readable medium embodies program instructions causing a computer to perform a method. The method includes training a neural network and using the neural network to generate a risk factor for each code element. The neural network is trained by placing the neural network in a learning mode and inputting suggestive data as input and error severity data as output, the output being presented to the neural network when the neural network is in the learning mode. Suggestive data includes data that correlates to a likelihood that a code element contains a severe error. Error severity data is an evaluation of a severity of any error that was present in the code element. The suggestive data and the error severity data are historical data of one or more computer programming projects. The risk factor is a value representing a likelihood and severity of an error in the code element. A coverage quality is determined based on the risk factors of the code elements executed during the test and the risk factors of the code elements not executed during the test.

In yet another embodiment, a system for estimating a quality of code coverage of a test is provided. The system includes a back propagation neural network and a coverage quality calculator. The back propagation neural network is configured to be placed in a learning mode wherein suggestive data is received as input and error severity data is received as output. The suggestive data includes data that correlates to a likelihood that a code element contains an error. The error severity data is an evaluation of a severity of any error that was present in the code element. The suggestive data and the error severity data are obtained from historical data of one or more computer programming projects. The neural network is further configured to generate a risk factor for each code element when not in the learning mode, the risk factor being a value representing a likelihood and severity of an error in the code element. The coverage quality calculator is configured to determine a coverage quality based on the risk factors of code elements tested during a test and risk factors of code elements not tested during the test.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
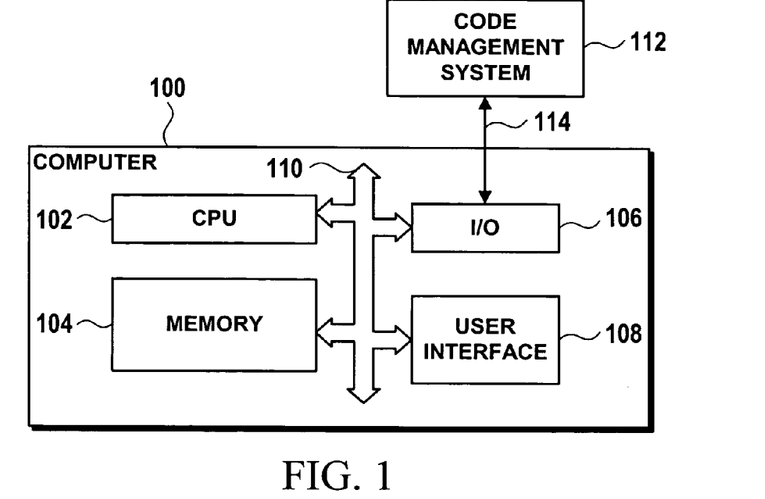
FIG. 1 shows an exemplary general purpose computer system which may be used to implement a code coverage quality estimator.

FIG. 1 shows an exemplary general purpose computer system 100 which may be used to implement a code coverage quality estimator. General purpose computer system 100 includes a central processing unit (CPU) 102, memory 104, input/output (I/O) ports 106, and a user interface 108, all of which may communicate via bus 110. CPU 102 receives data and instructions from memory 104 via bus 110 and executes the instructions to operate on the data. Results from the instructions can then be saved back to memory 104. Memory 104 may comprise multiple memories, such as volatile random access memory (RAM) and non-volatile mass storage, e.g., a hard disk storage device. I/O ports 106 may comprise any data transmission and/or receiving devices. In one example, I/O ports comprise a network interface allowing general purpose computer system 100 to connect to a code management system 112 via a network connection 114 for receiving code for testing. In one embodiment, user interface 108 comprises a video screen, keyboard, and mouse, enabling a user to interact with the computer system. Although in one embodiment, computer system 100 is a standalone computer system having its own processor(s), its own memory, and its own storage, it is also possible that computer system 100 can be a distributed computing system. In a distributed computer system, computer resources may be shared by a number of users. The users can therefore access a virtual computer over a network, which will appear to the user as a single computer customized and dedicated for a single user.

Figure 2:
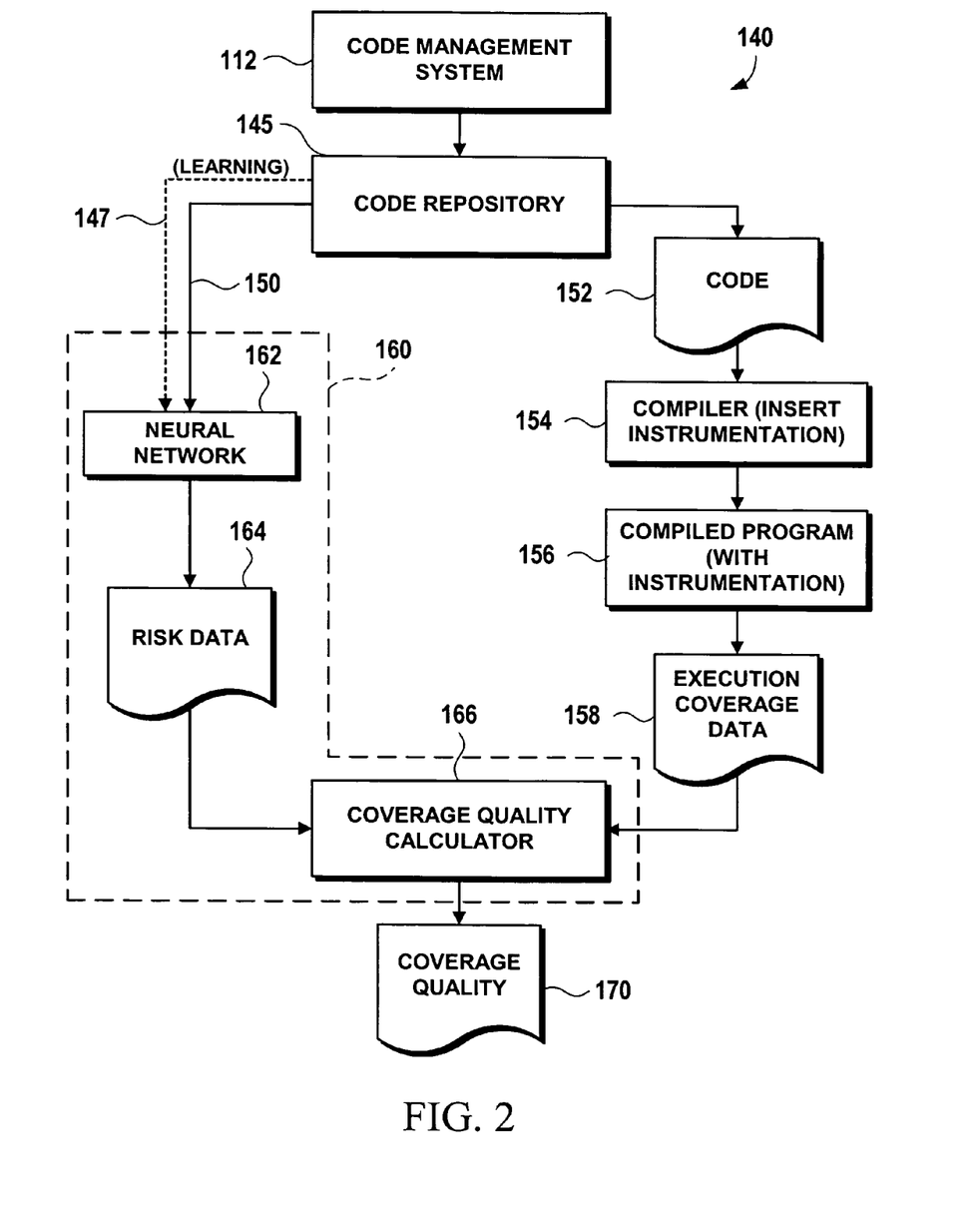
FIG. 2 shows an exemplary dataflow diagram for estimating code coverage quality.

FIG. 2 shows an exemplary dataflow diagram 140 for estimating code coverage quality. A code management system 112 manages revisions of one or more computer programs. In one embodiment, the code management system is implemented using Concurrent Versions Systems (CVS) software, which is available under an open source license from Free Software Foundation, Inc. of Boston, Mass. A code management system typically tracks revisions and bug reports relating to individual lines or sections of code. A code repository 145 is therefore maintained containing information relating to each line or section of code. In one embodiment, the code repository is a database that contains information on each line of code, including who last modified the line, why it was modified, and when it was modified. If it was modified to repair a bug, the severity of the bug may be recorded in code repository 145. In one embodiment, a bug tracking number is provided, which can then be correlated with a severity index using a separate bug-tracking application.

Code repository 145 may be made accessible as one or more files which can then be downloaded from the code management system 112 as described above with reference to FIG. 1, or as an API which can be accessed by code coverage quality estimator 160. Table 1 shows an exemplary code segment and associated data made available by code repository 145.

TABLE 1

| Line | Statement | Age | User | Error Severity |
|---|---|---|---|---|
| 1 | int main(int argc, char *argv[ ]) | | | |
| 2 | { | | | |
| 3 | char arg1[6]; | 10 days | userB | P5 |
| 4 | char arg2[5]; | 60 days | userB | no error |
| 5 | int iarg1; | 60 days | userA | no error |
| 6 | int iarg2; | 60 days | userA | no error |
| 7 | | | | |
| 8 | if (argc > 2) { | 60 days | userB | no error |
| 9 | strcpy(arg1, argv[1]); | 3 days | userB | P0 |
| 10 | strncpy (arg2, argv[2], 3); | 10 days | userB | P1 |
| 11 | } else { | | | |
| 12 | printf ("Not enough arguments"); | 10 days | userA | P3 |
| 13 | return 0; | 30 days | userB | P4 |
| 14 | | | | |
| 15 | iarg1 = atoi(arg1); | 60 days | userA | no error |
| 16 | iarg2 = atoi(arg2); | 60 days | userA | no error |
| 17 | | | | |
| 18 | printf("Final value is %d, iarg1 + iarg2); | 60 days | userA | no error |
| 19 | | | | |
| 20 | return 0; | 5 days | userA | no error |
| 21 | } | | | |

In the example shown in Table 1, the code may represent a snapshop of the code at some previous time during the development of the code. Thus, the code management system 112 provides access to previous revisions. This historical data can be used as described in more detail below to generate a series of observations to train neural network 162. Information provided by the code management system can be quite extensive. In the example presented in Table 1, the code management system includes the age of each line, who wrote it, and a comment regarding the revision. For example, line 3 contains the statement "char arg1[6];" written by userB 10 days ago to correct an error of severity level P5. In this example, bugs are categorized from P0 to P5 with P0 being the most severe bug and P5 being the most minor bug. It may also be the case that the statement was later found to contain the error, which was later corrected. Hence the error severity may be based on more recent data than was known at the time the statement was authored.

Code 152 can be received from code repository 145 which can then be read by a compiler 154. To generate execution coverage data 158, code 152 is instrumented using compiler 154 or a separate pre-compiler (not shown) which inserts execution tracing routines into the source code prior to compiling. After compiling, the program is tested by running the program according to known testing techniques, e.g., by running a test suite. The tracking instrumentation will generate execution coverage data 158 which identifies which code elements, e.g., lines of code, were executed during the test. In one embodiment, the coverage data 158 is generated dynamically as the test is proceeding.

A code coverage quality estimator 160 comprises a neural network 162 and a coverage quality calculator 166. In one embodiment, neural network 162 and coverage quality calculator 166 are separate computer programs. In another embodiment, neural network 162 and coverage quality calculator 166 are routines integrated into a single computer program. The neural network 162 comprises a software routine that models a back propagation neural network according to known principles of artificial neural network design. Neural networks are well known in the field of computer science, and may be used as an arbitrary function approximation mechanism that learns from observed data. In the present example, neural network 162 is provided to identify a level risk associated with specific code elements, wherein the level of risk corresponds to a likelihood that the code element contains a bug. A code element may be a statement, a path, a conditional branching statement, a basic block, a function, or other code subdivision. In one embodiment, neural network 162 undergoes training to learn a correspondence between the inputs provided and the risk associated with the specific code elements. As is generally known, learning involves inputting a series of observations into the neural network until the neural network creates a network that can accurately map out predicted behavior.

Figure 3:
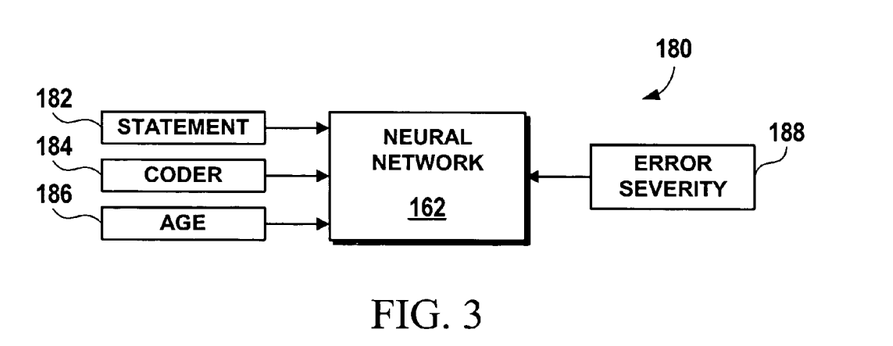
FIG. 3 shows a schematic diagram depicting an exemplary neural network training operation.

FIG. 3 shows a schematic diagram 180 depicting an exemplary neural network training operation. In this example, each code element is a statement, and suggestive data is provided to train neural network 162. Suggestive data is data that correlates or may correlate to a likelihood that the code element contains an error. In the example of FIG. 3, suggestive data includes the statement 182, the coder 184, and the age of the statement 186. Each input 182, 184, 186, is expected to have some correlation with the output 188, which is supplied to the neural network for training purposes. In this embodiment, the output is the error severity 188.

Statement 182 can be simply a key word such as "printf" or "strncpy." Those skilled in the art of programming will understand that a print statement such as "printf" may be less likely to cause a serious error than a memory copy function such as "strncpy." After sufficient training, the neural network will be able to identify which statements are more likely to trigger a serious error and assign those statements a greater risk.

Coder 184 can be the coder's username or other identifier that distinguishes the individual who wrote the statement 182. Those skilled in the are will understand that one coder having less programming experience or less familiarity with the specific software project is more likely to write code containing errors than a different coder that is more experienced and has more familiarity with the software project. For example, in the code presented in Table 1 it is clear that the code generated by userB as significantly more errors than the code generated by userA. It is therefore likely that future code generated by userB is more likely to contain bugs than future code generated by userA. After sufficient training, the neural network will be able to discriminate coders more likely to write buggy code from coders less likely to write buggy code.

Age 186 can be a number of days since statement 182 was written. Those skilled in the art will understand that the longer a specific statement has been present in the software project, the less likely it is that it would be associated with a bug. After sufficient training, the neural network will be able to identify the degree to which the age of a particular statement relates to the likelihood that it is error.

Other suggestive data which may correlate to a risk associated with a particular code element can also be used as inputs to neural network 162. For example, the number of variables in the statement, the type of variables, how close the statement is to a dangerous function (e.g., strcpy), etc. In general, the more information provided to the neural network, the more accurate the risk factors generated by the neural network is likely to be. If the code element is a basic block or function, suggestive data can include the number of certain types of statements, the number of statements contributed by each coder and the age of the youngest statement in days. Those skilled in the art will, with the aid of the present disclosure, be able to determine additional suggestive data for each type of code element.

Output is presented to neural network 162 in a learning mode. In the embodiment presented by way of example in FIG. 3, the output is a number representing error severity. If no error is associated with the current statement, then the error severity may be zero. Minor errors can be given a value of 10, while major errors, e.g., ones causing an exception fault, can be given a value of 100. These values are exemplary and other numbers can of course be used to represent different levels of severity, and the range of values (i.e., maximum and minimum values) can be arbitrarily selected.

Neural networks become more exact and precise based on larger amounts of data. The history of mature software projects allow a large amount of data points, allowing a more exact creation of a representative neural network. The more precise the neural network is, the better it will be in pinpointing problems. Typical code management servers utilize a check-in/check-out paradigm and maintain historical data relating to the development of the project. This historical data can be used to generate observations for training the neural network as described above with reference to FIG. 3.

An additional advantage of neural networks lies in their ability to construct nodes with weights. The more weight per node, the higher the consequence the node has to the output. By visually inspecting some neural networks, it may be possible to notice the large weights and react accordingly. For example, it may be apparent in the neural network that when coder A alters coder B's mature code with a high number of variables, many bugs were formed. Neural networks will flush out this problem, and arrangements may be made so that coder A never alters coder B's code.

Returning to FIG. 2, it can be seen that data is provided along path 147, which may represent a network connection, for example, to train neural network 162 based on historical data from code repository 145. It should also be understood that neural network 162 may be trained using historical data from multiple software projects. Therefore, historical data from one software project may be used to predict risk associated with specific statements in a different software project. Those skilled in the art of neural networks will understand that after learning a set of data, it can reach a threshold level of convergence on a solution, whereby it can then be used to assess risk determining a coverage quality estimate.

To generate a coverage quality estimate, the neural network can receive data from code repository 145, represented in FIG. 2 as line 150 as in the learning mode, but this time, instead of inputting the error severity, the neural network will output a value representative of a likelihood of an error severity.

Figure 4:
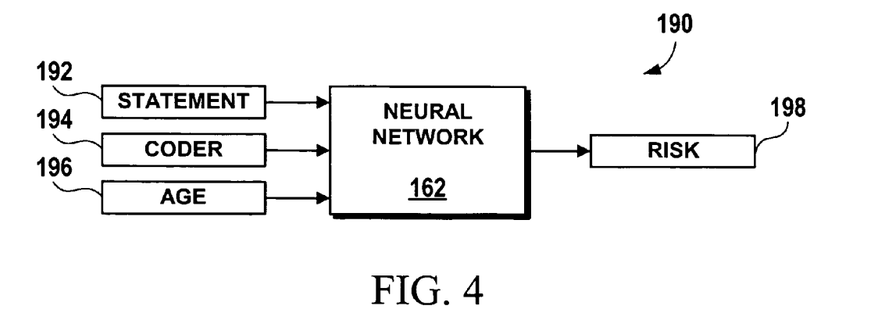
FIG. 4 shows a schematic diagram depicting an exemplary neural network risk assessment operation.

FIG. 4 shows a schematic diagram 190 depicting an exemplary neural network risk assessment operation. Thus, a software project may be modified from the time when neural network 162 is trained, and a new risk assessment is desired in order to provide a coverage quality estimate. For each code element, information relating to the code element is input into neural network 162 and a risk 198 value is output. In this exemplary operation, a risk assessment 198 is generated for each statement. To generate the risk assessment, the same type of information that was provided in the learning mode described above with reference to FIG. 3 is input into neural network 162. This information may include, for example the statement 192, coder identifier 194 identifying the individual who authored the statement, and the statement age 196. In the normal mode of operation of the neural network, it is able to generate an output value representative of the expected error severity as supplied during the learning mode. In this normal mode of operation, it is referred to herein as risk, since greater error likelihood and greater error severity can be referred to more easily as risk.

Returning to FIG. 2, risk data 164 includes a risk factor generated by neural network 162 for each code element of source code 152 obtained from code repository 145. Coverage quality calculator 166 can then take the execution coverage data 158 generated by the compiled program and combine this information with the risk data 164 generated by neural network 162 to produce a coverage quality index 170. Execution coverage data 158 and risk data 164 can be combined in a number of ways. In one embodiment, the risk value for each line is classified in a plurality of categories, such as "Major concern", "Little concern", or "No concern". Statements classified as "Major concern" could be statements having a high chance of a bug, and a high chance that the bug is severe. "Little concern" could be statements having a high chance of a bug with low severity, or low chance of a bug with high severity. Finally, "no concern" could be statements having a only a low chance of bug with low severity. Then the execution coverage data can be compared with this risk data to determine the percentage of coverage for each of the categories. For illustrative purposes, a target threshold for testing may be 100% of all statements of major concern and 60% of all statements of little concern.

In another embodiment, each statement is weighted according to the degree of risk associated with that statement. If the risk is zero, then the statement is weighted zero and is therefore not counted as a statement for coverage calculation purposes. If statement is of major concern, then the statement can be weighted so that it counts the same amount as 50 statements of little concern. This weighting factor is of course exemplary, and other weighting factors may be used as appropriate depending on how "major concern" is defined relative to "little concern." Thus, a simple formula can be carried out to determine a coverage quality percentage:

$$\frac{(WF)(MCE) + LCE}{(WF)(MC) + LC} = CQ \quad \text{(Equation 1)}$$

In Equation 1 above, MCE is the number of major concern statements that were executed and LCE is the number of little concern statements executed. MC is the total number of major concern statements and LC is the total number of little concern statements. WF is the weighting factor for major concern statements, and, in one embodiment, is equal to 50. In another embodiment WF is equal to 100. The resulting value CQ is the coverage quality, which can be multiplied by 100 to obtain a percentage value.

Equation 1 can be generalized to:

$$\frac{\sum_{RC=0 \to n} (RC)(EC_{RC})}{\sum_{RC=0 \to n} (RC)(C_{RC})} \times 100 = CQ\% \quad \text{(Equation 2)}$$

In equation 2 above, RC is a particular risk category, n is the highest value of RC for the particular set of RCs implemented, $EC_{RC}$ is the number of executed code elements assigned to risk category RC, $C_{RC}$ is the total number of code elements assigned to risk category RC, and CQ % is a the quality of code coverage expressed as a percentage value. In one example presented here for illustration purposes, each code element is classified in one of four risk categories such that for each code element, RC is equal to 0, 1, 20, or 100 depending on the risk factor produced by the neural network. Thus, Equation 2 does not require a continuous linear relation between risk factors and risk categories. By using risk categories, any level of granularity can therefore be attained.

As can be seen, Equation 2 can be used with any number of risk categories. It is possible to use Equation 2 wherein each risk factor value (RF) generated by the neural network could substitute for the risk category (RC) in equation 2 above. Other variations are also possible. For example, with RF being the value generated by the neural network and used instead of RC in equation 2, RF can be multiplied by some constant or raised to a constant power to provide additional weight to higher risk statements.

Figure 5:
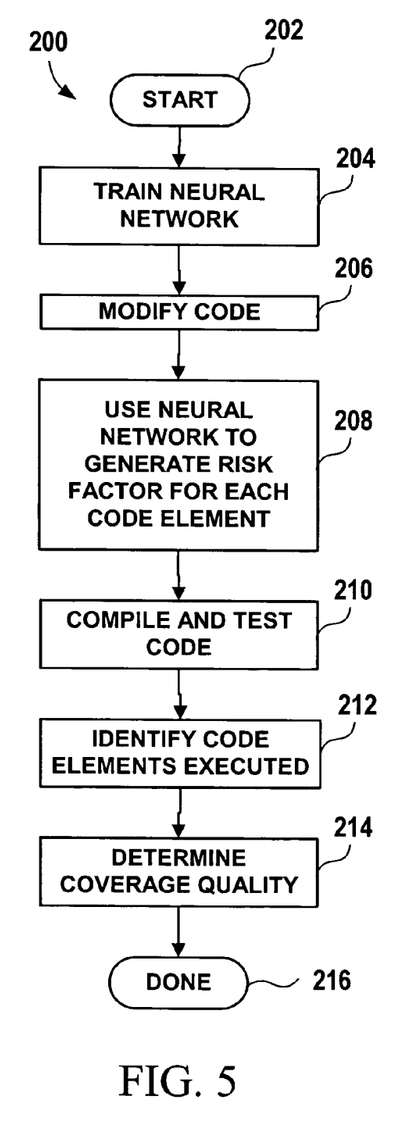
FIG. 5 shows a flowchart depicting an exemplary procedure for obtaining a code coverage quality estimate.

FIG. 5 shows a flowchart 200 depicting an exemplary procedure for obtaining a code coverage quality estimate. The procedure begins as indicated by start block 202 and proceeds to operation 204 wherein a neural network is trained. As mentioned above, the neural network may be trained using historical data for a particular project, or using historical data from multiple projects. The historical data can provide any number of inputs to the neural network, each of which may provide some indication as to the risk that a specific code element is in erroneous. Depending on the implementation, the code element selected can be a statement, a basic block, a function or procedure, a condition, a path, etc., as known in the field of code coverage analysis. Training is performed as described above with reference to FIG. 3. After training the neural network, the code may be modified as indicated in operation 206. Of course, the code may be modified prior to training the neural network, but for illustration purposes, flowchart 200 shows operation 206 following operation 204 to suggest that the data used to train the neural network is not the same data used to generate risk data.

In operation 208, the neural network is used to generate a risk factor for each code element. The risk factor is a prediction of the likelihood and severity of an error in the code element.

In operation 210, the code is compiled and tested. This operation may be performed in an order other than that presented in flowchart 200. For example, the code may be compiled and tested prior to operation 208. The testing generates execution data that indicates which of the code elements were actually executed during the test. In operation 212, the execution data is used to determine which of the code elements were executed during the test. Finally in operation 214, the risk factor generated in operation 208 and the execution data indicating which of the code elements were executed is used to determine a coverage quality. The coverage quality can be calculated as described below with reference to FIGS. 6 and 7. After determining the coverage quality, the procedure ends as indicated by done block 216.

Figure 6:
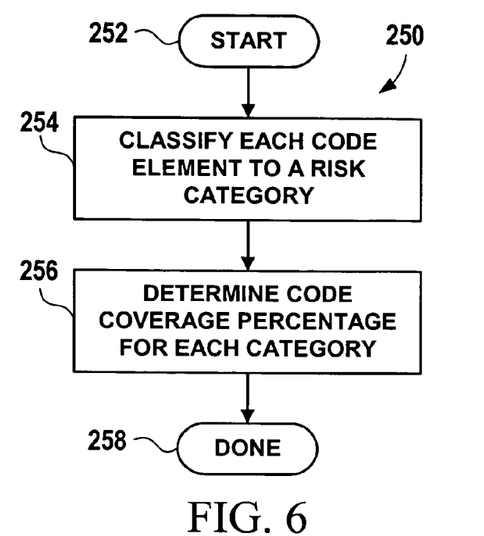
FIG. 6 shows flowchart depicting an exemplary procedure for calculating a coverage quality.

FIG. 6 shows flowchart 250 depicting an exemplary procedure for calculating a coverage quality. This procedure begins as indicated by start block 252 and proceeds to operation 254 wherein each code element is classified in a risk category. Exemplary categories may be "major concern," "little concern," and "no concern." The classification of the code elements can be made based on the risk factors identified by the neural network. For example, if the neural network is configured to output a risk factor value from zero to 100 wherein zero represents no possibility of an error and 100 represents that it is very likely that a severe error is present, then risk factors from zero to 20 can be classified as "no concern," risk factors from 21 to 50 can be classified as "little concern," and risk factors from 51 to 100 can be classified as "major concern." These risk categories and risk factor classifications are provided herein for illustrative purposes only and other risk categories and risk factor classifications can be selected depending on the implementation. After classifying the code elements into risk categories, the procedure flows to operation 256.

In operation 256, the code coverage percentage is determined for each risk category. Thus, for the example cited above, the number of major concern code elements that were executed during the test are compared to the total number of major concern code elements and the number of little concern code elements that were executed during the test are compared to the total number of little concern code elements. The results of this comparison will yield a percentage of major concern elements tested and a percentage of little concern elements tested. These percentage values are more useful to those measuring the thoroughness of a test than a naked percentage that does not distinguish between code elements likely to cause a major error and code elements unlikely to cause any error. After identifying the percentages for the risk categories, the procedure ends as indicated by done block 258.

Figure 7:
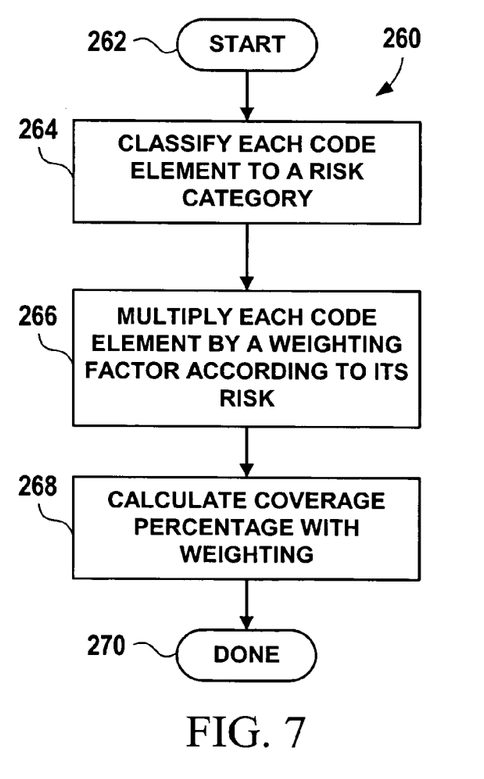
FIG. 7 shows a flowchart depicting a second exemplary method for estimating a coverage quality.

FIG. 7 shows a flowchart 260 depicting a second exemplary method for estimating a coverage quality. The procedure begins as indicated by start block 262, and proceeds to operation 264 wherein each code element is classified into a risk category. The classification operation is similar to that described above with reference to FIG. 6. After classifying each code element into a risk category, the procedure flows to operation 266 wherein each code element is multiplied by a weighting factor according to its risk category. More specifically, the number of code elements that were executed and the total number of code elements executed is determined by multiplying code elements belonging to a high risk category by a weighting factor. This is performed as described above with reference to Equation 1. After determining the weighted totals of code elements, the procedure flows to operation 268 wherein a weighted code coverage percentage is calculated, e.g., as described above with reference to Equation 1. The weighted code coverage percentage can be viewed as a valuation of the quality of the code coverage; hence, a code coverage quality is determined. The procedure then ends as indicated by done block 270.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for estimating a quality of code coverage of a test, the estimating being executed by a processor, the method comprising:

training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element;

using the neural network to generate a risk factor for each code element, the risk factor being a value representing a likelihood and severity of an error in the code element;

identifying code elements tested during the test;

determining a coverage quality based on the risk factors of the code elements tested during the test and the risk factors of the code elements not tested during the test;

storing the coverage quality to a machine readable medium;

wherein the suggestive data and the error severity data being historical data of at least one computer programming projects.

2. A computer-implemented method for estimating a quality of code coverage of a test, the estimating being executed by a processor, the method comprising:

training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element;

using the neural network to generate a risk factor for each code element, the risk factor being a value representing a likelihood and severity of an error in the code element;

identifying code elements tested during the test;

determining a coverage quality based on the risk factors of the code elements tested during the test and the risk factors of the code elements not tested during the test;

storing the coverage quality to a machine readable medium;

wherein each code element comprises a statement; and wherein the suggestive data comprises the statement, an age of the statement, and an identifier that identifies a person who authored the statement.

3. A computer-implemented method for estimating a quality of code coverage of a test, the estimating being executed by a processor, the method comprising:

training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element;

using the neural network to generate a risk factor for each code element, the risk factor being a value representing a likelihood and severity of an error in the code element;

identifying code elements tested during the test;

determining a coverage quality based on the risk factors of the code elements tested during the test and the risk factors of the code elements not tested during the test;

storing the coverage quality to a machine readable medium;

wherein the determining of the coverage quality comprises:

classifying each of the code elements into a risk category according to the risk factors of the code elements; and determining a code coverage percentage for each risk category.

4. A computer-implemented method for estimating a quality of code coverage of a test, the estimating being executed by a processor, the method comprising:

training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element;

using the neural network to generate a risk factor for each code element, the risk factor being a value representing a likelihood and severity of an error in the code element;

identifying code elements tested during the test;

determining a coverage quality based on the risk factors of the code elements tested during the test and the risk factors of the code elements not tested during the test;

storing the coverage quality to a machine readable medium;

wherein the determining of the coverage quality comprises:

classifying each of the code elements into one of a plurality of risk categories according to the risk factors of the code elements; and applying a weight factor to each code element classified in at least one of the risk categories; and calculating a weighted coverage percentage.

5. The method of claim 4, wherein the calculating of the weighted coverage percentage includes solving:

$$\frac{(WF)(MCE) + LCE}{(WF)(MC) + LC} \times 100 = CQ\%$$

wherein WF is the weight factor, MCE is a number of the code elements that was executed and belong to a high-risk category; LCE is a number of the code elements that was executed and belong to a low-risk category; MC is a total number of code elements in the high-risk category, LC is a total number of code elements in the low-risk category, and CQ % is the weighted coverage percentage.

6. The method of claim 4, wherein the determining of the coverage quality comprises solving:

$$\frac{\sum_{RC=1 \to n} (RC)(EC_{RC})}{\sum_{RC=1 \to n} (RC)(C_{RC})} \times 100 = CQ\%$$

wherein RF is the risk factor; $EC_{RF}$ is a number of code elements that was executed having the risk factor RF, CRF is a total number of code elements having the risk factor RF, and CQ % is the coverage quality expressed as a percentage value.

7. A machine readable medium for estimating a quality of code coverage of a test, the machine readable medium embodying program instructions causing a computer to perform a method comprising:

training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element, the suggestive data and the error severity data being historical data of at least one computer programming projects;

using the neural network to generate a risk factor for each code element, the risk factor being a value representing a likelihood and severity of an error in the code element;
identifying code elements tested during the test; and
determining a coverage quality based on the risk factors of the code elements tested during the test and the risk factors of the code elements not tested during the test;
wherein each code element comprises a statement;
wherein the suggestive data comprises the statement, an age of the statement, and an identifier that identifies a person who authored the statement.

8. A machine readable medium for estimating a quality of code coverage of a test, the machine readable medium embodying program instructions causing a computer to perform a method comprising:
training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element, the suggestive data and the error severity data being historical data of at least one computer programming projects;
using the neural network to generate a risk factor for each code element, the risk factor being a value representing a likelihood and severity of an error in the code element;
identifying code elements tested during the test; and
determining a coverage quality based on the risk factors of the code elements tested during the test and the risk factors of the code elements not tested during the test;
wherein the determining of the coverage quality comprises:
classifying each of the code elements into a risk category according to the risk factors of the code elements; and
determining a code coverage percentage for each risk category.

9. A machine readable medium for estimating a quality of code coverage of a test, the machine readable medium embodying program instructions causing a computer to perform a method comprising:
training a neural network by placing the neural network in a learning mode and inputting suggestive data as input and error severity data as output, the output being presented to the neural network when the neural network is in the learning mode, the suggestive data comprising data that correlates to a likelihood that a code element contains an error, and the error severity data is an evaluation of a severity of any error that was present in the code element, the suggestive data and the error severity data being historical data of at least one computer programming projects;
using the neural network to generate a risk factor for each code element, the risk factor being a value representing a likelihood and severity of an error in the code element;
identifying code elements tested during the test; and
determining a coverage quality based on the risk factors of the code elements tested during the test and the risk factors of the code elements not tested during the test;
wherein the determining of the coverage quality comprises:
classifying each of the code elements into one of a plurality of risk categories according to the risk factors of the code elements; and
applying a weight factor to each code element classified in at least one of the risk categories; and
calculating a weighted coverage percentage.

10. The machine readable medium of claim 9, wherein the calculating a weighted coverage percentage includes solving:

$$\frac{(WF)(MCE) + LCE}{(WF)(MC) + LC} \times 100 = CQ\%$$

wherein WF is the weight factor, MCE is a number of the code elements that was executed and belong to a high-risk category; LCE is a number of the code elements that was executed and belong to a low-risk category; MC is a total number of code elements in the high-risk category, LC is a total number of code elements in the low-risk category, and CQ % is the weighted coverage percentage.

11. A computer-based artificial neural network system for estimating a quality of code coverage of a test, the system comprising:
a back propagation neural network defined on one or more computers and configured to be placed in a learning mode wherein suggestive data is received as input and error severity data is received as output, the suggestive data comprising data that correlates to a likelihood that a code element contains an error, and the error severity data is an evaluation of a severity of any error that was present in the code element, the suggestive data and the error severity data being historical data of at least one computer programming projects, the back propagation neural network further being configured to generate a risk factor for each code element when not in the learning mode, the risk factor being a value representing a likelihood and severity of an error in the code element;
a coverage quality calculator defined on the one or more computers, the coverage quality calculator being configured to determine a coverage quality based on the risk factors of code elements tested during a test and risk factors of code elements not tested during the test, and
memory for saving the coverage quality for the test.

12. The system of claim 11, wherein each code element comprises a statement.

13. The system of claim 12, wherein the suggestive data comprises the statement, an age of the statement, and an identifier that identifies a person who authored the statement.

14. The system of claim 11, wherein the coverage quality calculator is configured to determine the coverage quality by classifying each of the code elements into a risk category according to the risk factors of the code elements and determining a code coverage percentage for each risk category.

15. The system of claim 11, wherein the coverage quality calculator is configured to determine the coverage quality by:
classifying each of the code elements into one of a plurality of risk categories according to the risk factors of the code elements;
applying a weight factor to each code element classified in at least one of the risk categories; and
calculating a weighted coverage percentage.

16. The system of claim 15, wherein the calculating of the weighted coverage percentage includes solving:

$$\frac{(WF)(MCE) + LCE}{(WF)(MC) + LC} \times 100 = CQ\%$$

wherein WF is the weight factor, MCE is a number of the code elements that was executed and belong to a high-risk category; LCE is a number of the code elements that was executed and belong to a low-risk category; MC is a total number of code elements in the high-risk category, LC is a total number of code elements in the low-risk category, and CQ % is the weighted coverage percentage.

* * * * *